(12) United States Patent  
Cheung et al.

(10) Patent No.: US 9,096,303 B2
(45) Date of Patent: Aug. 4, 2015

(54) AIRPLANE SIDEWALL ATTACHMENT DEVICE

(71) Applicant: The Boeing Company, Seal Beach, CA (US)

(72) Inventors: W Kwun-Wing Cheung, Shoreline, WA (US); Christopher L Schwitters, Bothell, WA (US)

(73) Assignee: THE BOEING COMPANY, Chicago, IL (US)

( * ) Notice: Subject to any disclaimer, the term of this patent is extended or adjusted under 35 U.S.C. 154(b) by 146 days.

(21) Appl. No.: 13/740,778

(22) Filed: Jan. 14, 2013

(65) Prior Publication Data

US 2014/0197278 A1    Jul. 17, 2014

(51) Int. Cl.
- B64C 1/06  (2006.01)
- B64C 1/00  (2006.01)
- B64F 5/00  (2006.01)

(52) U.S. Cl.
CPC . B64C 1/00 (2013.01); B64C 1/066 (2013.01); B64F 5/0009 (2013.01); Y10T 29/49622 (2015.01)

(58) Field of Classification Search
CPC ................................ B64C 1/00; B64C 1/066
USPC ......... 244/117 R, 118.1, 118.2, 118.5, 129.1, 244/131, 132; 52/275, 309.11, 426, 578; 52/656.9; 296/186.1, 191, 146.7, 1.08
See application file for complete search history.

(56) References Cited

U.S. PATENT DOCUMENTS

| | | |
|---|---|---|
| 1,940,969 A | 12/1933 | Randall |
| 1,942,119 A | 1/1934 | Place |
| 1,948,462 A | 2/1934 | Le Page |
| 1,965,520 A | 7/1934 | Boden |
| 2,069,176 A * | 1/1937 | Budd ............................. 52/578 |
| 2,070,839 A | 2/1937 | Place |

(Continued)

FOREIGN PATENT DOCUMENTS

| | | |
|---|---|---|
| DE | 3528316 A1 | 1/1987 |
| DE | 102005030997 | 12/2006 |

(Continued)

OTHER PUBLICATIONS

US Patent and Trademark Office; Office Action for U.S. Appl. No. 13/485,720 dtd Nov. 21, 2013.

(Continued)

*Primary Examiner* — Philip J Bonzell
*Assistant Examiner* — Nicholas McFall
(74) *Attorney, Agent, or Firm* — Parsons Behle & Latimer (57) ABSTRACT

A system for attaching an aircraft wall panel to an airframe member includes a top support bracket having a mating member, a lower support bracket having a mating pin, and an aircraft wall panel having a first stabilizing attachment and a first securing attachment. The first stabilizing and securing attachments are arranged on a rear surface of the aircraft wall panel. The first stabilizing attachment is configured to connect to the mating member of the top support bracket and retain the aircraft wall panel in proximity to the airframe member. The first securing attachment is configured to connect to the mating pin of the lower support bracket to (a) engage the lower support bracket and facilitate horizontal and vertical adjustments of the aircraft wall panel in relation to the airframe member, and (b) lock a position of the first securing attachment relative to the lower support bracket.

20 Claims, 10 Drawing Sheets

(56) References Cited

U.S. PATENT DOCUMENTS

| | | | |
|---|---|---|---|
| 2,925,050 | A | 2/1960 | Candlin, Jr. et al. |
| 3,752,553 | A | 8/1973 | Bildahl et al. |
| 5,108,048 | A * | 4/1992 | Chang .................. 244/118.1 |
| 5,202,172 | A | 4/1993 | Graf |
| 5,335,893 | A * | 8/1994 | Opp ....................... 248/635 |
| 5,458,521 | A | 10/1995 | Todd |
| 6,224,339 | B1 | 5/2001 | Rhodes et al. |
| 6,701,678 | B1 | 3/2004 | Skov et al. |
| 7,059,565 | B2 * | 6/2006 | Scown et al. ............ 244/117 R |
| 7,527,223 | B2 | 5/2009 | Ebner et al. |
| 7,658,044 | B2 | 2/2010 | Roth |
| 2004/0190985 | A1 | 9/2004 | Aigner et al. |
| 2009/0008502 | A1 | 1/2009 | Lynas |
| 2009/0026318 | A1 | 1/2009 | Gross et al. |
| 2010/0001137 | A1 * | 1/2010 | Keener ..................... 244/131 |

FOREIGN PATENT DOCUMENTS

| | | |
|---|---|---|
| EP | 0262704 | 4/1988 |
| EP | 0279620 B1 | 6/1993 |
| EP | 0761905 A1 | 3/1997 |
| EP | 1172500 A1 | 1/2002 |
| EP | 1338719 A1 | 8/2003 |
| EP | 1468907 B1 | 7/2008 |
| EP | 2354570 | 8/2011 |
| EP | 2372170 | 10/2011 |

OTHER PUBLICATIONS

US Patent and Trademark Office; Final Office Action for U.S. Appl. No. 13/485,720 dtd May 7, 2014.

Patent Cooperation Treaty, International Search Report and Written Opinion for PCT/US2013/073762 dated Apr. 24, 2014.

* cited by examiner

AIRPLANE SIDEWALL ATTACHMENT DEVICE

CROSS-REFERENCE TO RELATED APPLICATIONS

This is related to U.S. Non-Provisional application Ser. No. 13/485,720, titled WALL INSTALLATION SYSTEM AND METHOD, filed on May 31, 2012, which is hereby incorporated by reference in its entirety.

BACKGROUND

The present disclosure relates generally to the field of modular sidewall panel systems and more specifically to aircraft sidewall panel systems. Typically, sidewall panels are installed using tools and hardware including screws, washers, screw drivers, panel sport aid, and shims, among other things. The process of installing sidewall panels generally involves mounting the panels in a predetermined order evaluating the alignment of the panels once mounted, removing the panels and adjusting the mounting brackets, remounting the panels, and re-evaluating alignment. The process tends to be time-consuming and involve manpower and expertise.

In some cases, sidewall panels may be attached to the airframe at eight or more points. In one example, this may be done using screws and washers. Additionally, mechanics may have to adjust the alignment of the underlying brackets attached to the airframe in order to achieve alignment with, for instance, adjacent panels and the structural windows of the aircraft. One challenge associated with eight or more points of contact between sidewall panels and the airframe is aligning each point of contact on the airframe with that of the panel.

In some embodiments, removal of one panel may necessitate the removal of adjacent panels. For instance, panels may share mounting hardware, for instance, washers, and thus the removal of one panel may require also removing the hardware of adjacent panels. Additionally, because panels may be installed in a shingled pattern, wherein each adjacent panel overlaps at least one of its neighboring sidewall panels, in some cases it may be necessary to start and one end and remove many, if not all, intervening panels in order to access the desired sidewall panel.

Additionally, the mounting brackets of sidewall panels, often called shock mount brackets, may be installed into the airframe using multiple screws and/or bolts. In some embodiments, the installation of shock mount brackets may mean that the airframe insulation must be pierced.

There is a need for a sidewall panel system that may be installed without tools and hardware, and that may be accomplished by only one installer or mechanic. There is a need for a sidewall panel system that may be aligned without removing and adjusting the underlying shock mount brackets. There is a need for a sidewall panel system that may be easily aligned with the shock mount brackets during the initial attachment process. It is preferable that the sidewall panel system not be installed by piercing the airframe insulation layer. There is a need for a sidewall panel system in which the sidewall panels may be easily removed, and that may be removed in some cases without also removing adjacent sidewall panels.

SUMMARY

A system for attaching an aircraft wall panel to an airframe member is disclosed herein. The system includes a top support bracket coupled to a first location on the airframe member and having a mating member, a lower support bracket coupled to a second location on the airframe member and having a mating pin, and an aircraft wall panel having a first stabilizing attachment and a first securing attachment. The first stabilizing and securing attachments are arranged on a rear surface of the aircraft wall panel. The first stabilizing attachment is configured to connect to the mating member of the top support bracket and retain the aircraft wall panel in proximity to the airframe member. The first securing attachment is configured to connect to the mating pin of the lower support bracket to (a) engage the lower support bracket and facilitate horizontal and vertical adjustments of the aircraft wall panel in relation to the airframe member, and (b) lock a position of the first securing attachment relative to the lower support bracket.

A method of attaching an aircraft wall panel to an airframe is also disclosed herein. In this method, the aircraft wall panel includes a first stabilizing attachment, a first securing attachment, and a second securing attachment. The method comprises attaching the first stabilizing attachment of the aircraft wall panel to a top support bracket, wherein the top support bracket comprises a mating member to which the first stabilizing attachment is slidably attached. The method also comprises attaching the first securing attachment to a first lower support bracket, wherein the first lower support bracket comprises a mating pin to which the first securing attachment is engaged. The method also comprises attaching the second securing attachment to a second lower support bracket, wherein the second lower support bracket comprises a mating pin to which the second securing attachment is engaged. The method also comprises adjusting a horizontal positioning of the first securing attachment in relation to the first lower support bracket, locking the first securing attachment to fully secure the first securing attachment in relation to the first lower support bracket, adjusting a vertical positioning of the second securing attachment in relation to the second lower support bracket, and locking the second securing attachment to fully secure the second securing attachment in relation to the second lower support bracket.

A system for attaching a wall panel to a frame member is also disclosed herein. The system includes a top support bracket coupled to a first location on the frame member; a lower support bracket coupled to a second location on the frame member, and a first wall panel having at least one stabilizing attachment and at least one securing attachment. The at least one stabilizing attachment is configured to connect to the top support bracket and retain the first wall panel in proximity to the frame member. The at least one securing attachment is configured to connect to the lower support bracket to (a) engage the lower support bracket and facilitate horizontal and vertical adjustments of the wall panel in relation to the frame member, and (b) lock a position of the at least one securing attachment relative to the lower support bracket.

The preceding embodiments are not intended to be interpreted in a restrictive sense. Indeed, the preceding system embodiments are provided to illustrate possible embodiments of a wall panel attachment system that may be used on aircraft, ships, pre-fabricated homes, and any other structure comprises attaching modular wall panels to an existing frame. The preceding method embodiment is provided to illustrate a method of attaching an aircraft wall panel to the airframe of an aircraft, and is not intended to be interpreted in a restrictive sense. Indeed, none of the embodiments listed in the current disclosure are intended to limit the interpretation of the relevant claim terms. For instance, in some embodiments, the frame may be any structure configured to provide an outer structure or shape to a construction.

BRIEF DESCRIPTION OF THE DRAWINGS

Like reference numbers and designations in the various drawings indicate like elements.

DETAILED DESCRIPTION

In the following detailed description, reference is made to the accompanying drawings that form a part hereof, and in which is shown by way of illustration specific embodiments in which the disclosure may be practiced. These embodiments are described in sufficient detail to enable those skilled in the art to practice the disclosure, and it is to be understood that other embodiments may be utilized and that various changes may be made without departing from the spirit and scope of the present disclosure. The following detailed description is, therefore, not to be taken in a limiting sense.

Figure 1:
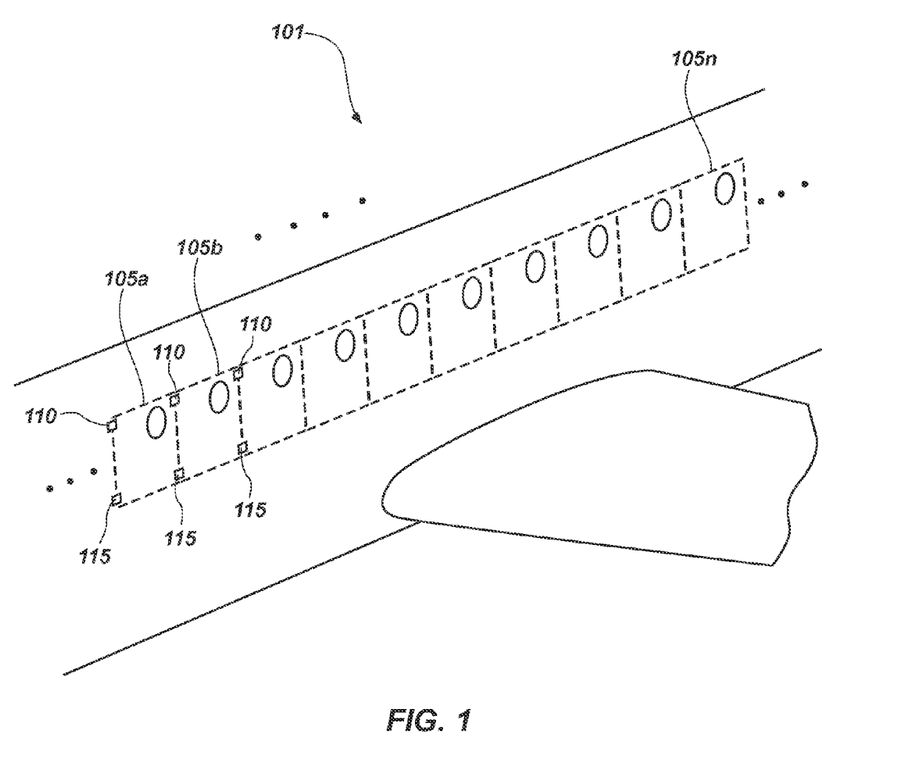
FIG. 1 is a profile view of an aircraft illustrating the placement of sidewall panels.

FIG. 1 shows an upper profile view of an aircraft 101. As demonstrated by the broken lines, the interior of the fuselage of the aircraft 101 can comprise a plurality of sidewall panels 105a-105n. Sidewall panels 105a-105n can attach to the airframe of the aircraft 101 via top support brackets 110 and lower support brackets 115.

In practice, a mechanic (as used herein, "mechanic" refers to any person or non-person, such as a robot, who may install, remove, or adjust sidewall panels 105a-105n) may install sidewall panels 105a-105n by first attaching a stabilizing attachment (not shown) of a sidewall panel (e.g., 105a) to a top support bracket 110. In one embodiment, the connection of the stabilizing attachment to the top support bracket 110 is such as to retain the sidewall panel 105a in proximity to the airframe of the aircraft 101 but nevertheless leave sidewall panel 105a with adequate freedom-of-movement to make necessary horizontal and vertical adjustments. Once the sidewall panel 105a is attached to the top support bracket 110, a securing attachment (not shown) of the sidewall panel 105a engages a lower support bracket 115. Once the securing attachment engages the lower support bracket 115, the panel may be adjusted horizontally and/or vertically to achieve optimal alignment with the airframe and neighboring sidewall panels (e.g., 105b). Once vertical and horizontal alignment is achieved, the securing attachment may be fully secured to the lower support bracket 115. In one embodiment, fully securing the securing attachment to the lower support bracket 115 may be achieved by placing pressure on the sidewall panel 105 to lock the securing attachment to the lower support bracket 115. As discussed herein, adjustments to the alignment of sidewall panels 105a-105n are discussed in terms of horizontal and vertical adjustments; this approach is for ease of description and is not to be interpreted in a limiting sense. Indeed, in one embodiment, alignment of a sidewall panel 105a may be performed in any number of directions, including, but not limited to inboard and outboard movement, lateral movement, and waterline movement, among other things.

Figure 2A:
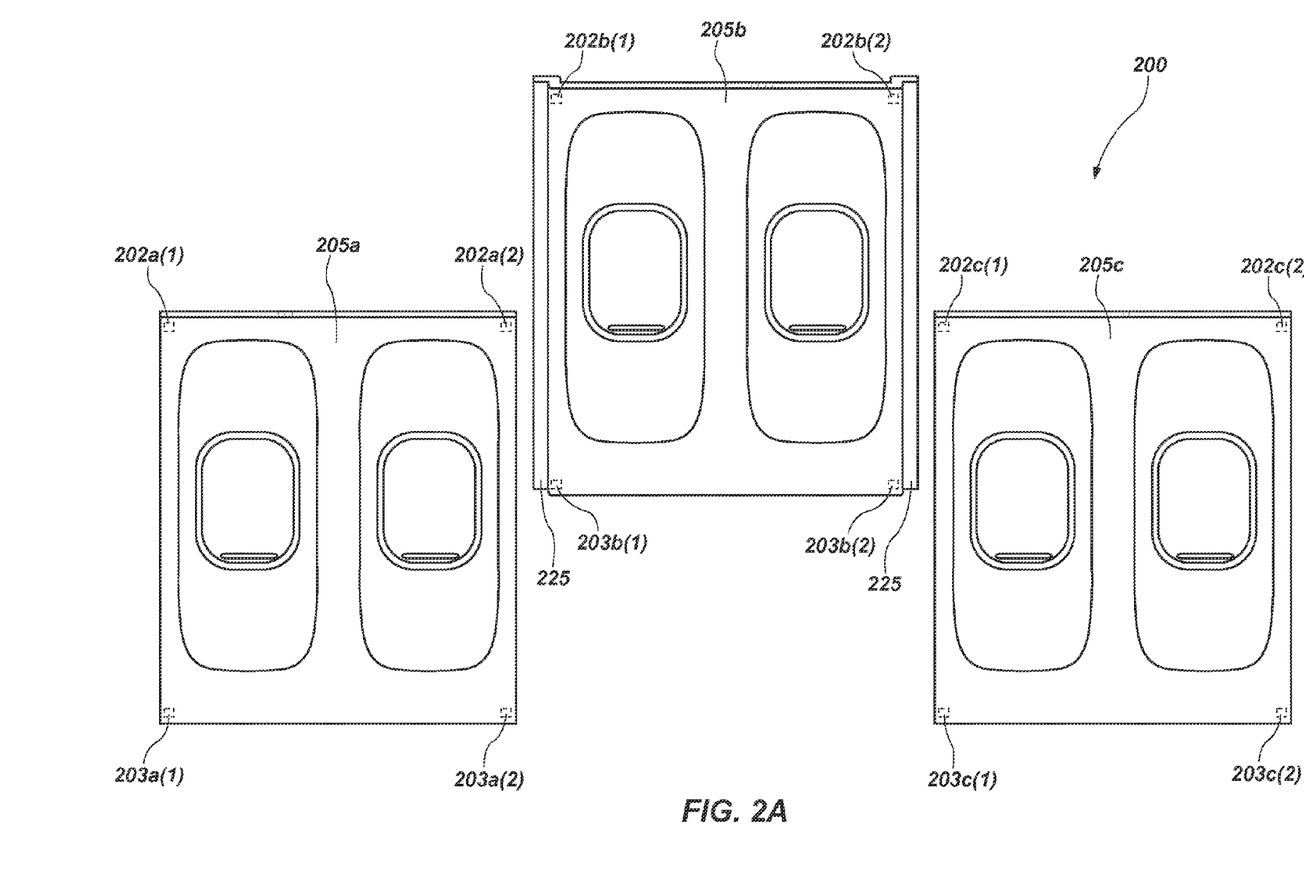
FIGS. 2A and 2B illustrate an aircraft sidewall panel system.
Figure 2B:
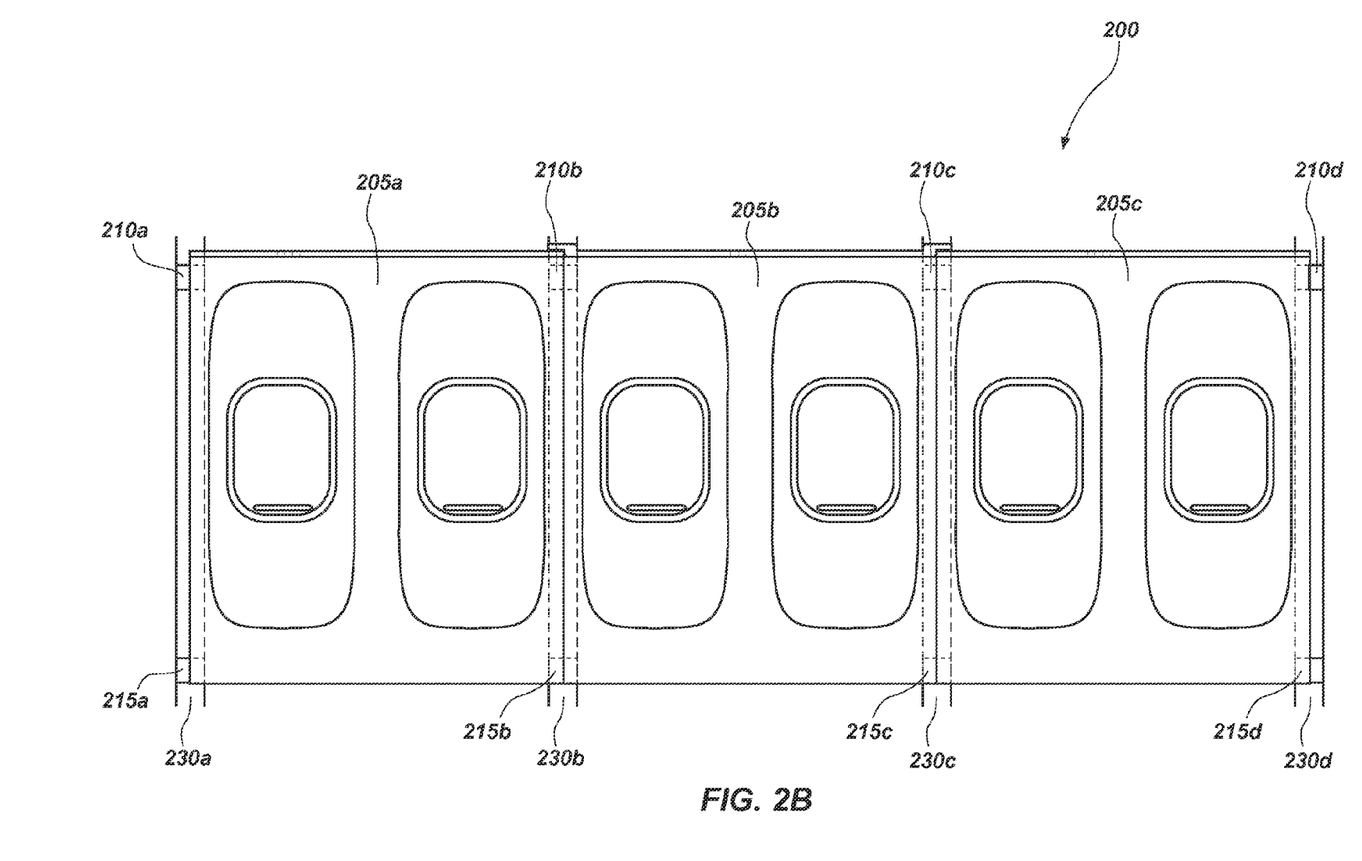

FIGS. 2A and 2B show a view of a sidewall panel system 200. The interior of the fuselage of an aircraft 101 comprises airframe members 230a-230d upon which sidewall panels 205a-205c are attached. A top support bracket 210a-210d is attached at a first location on airframe member 230a-230d, respectively. A lower support bracket 215a-215d is attached at a second location on airframe member 230a-230d, respectively. In one embodiment, top support brackets 210a-210d may be configured to accept two stabilizing attachments each. For instance, top support bracket 210b may be configured to attach to both stabilizing attachment 202a(2) and stabilizing attachment 202b(1). In one embodiment, lower support brackets 215a-215d may be configured to accept two securing attachments each. For instance, lower support bracket 215b may be configured to attach to both securing attachment 203a(2) and securing attachment 203b(1).

In one embodiment, sidewall panels 205a, 205b, and 205c may comprise two stabilizing attachments each, one in each of the two upper corner quadrants; and two securing attachments, one in each of the two lower corner quadrants. For instance, sidewall panel 205a may comprise stabilizing attachments 202a(1) and 202a(2) and securing attachments 203a(1) and 203a(2). Stabilizing attachments 202a(1) and 202a(2) may be bonded to a rear surface of sidewall panel 205a and may be attached to top support brackets 210a and 210b, respectively; stabilizing attachments 202b(1) and 202b(2) may be bonded to a rear surface of sidewall panel 205b and may be attached to top support brackets 210b and 210c, respectively; 202c(1) and 202c(2) may be bonded to a rear surface of sidewall panel 205c and may be attached to top support brackets 210c and 210d, respectively. Securing attachments 203a(1) and 203a(2) may be bonded to a rear surface of sidewall panel 205a and may be attached to lower support brackets 215a and 215b, respectively; securing attachments 203b(1) and 203b(2) may be bonded to a rear surface of sidewall panel 205b and may be attached to lower support brackets 215b and 215c, respectively; and securing attachments 203c(1) and 203c(2) may be bonded to a rear surface of sidewall panel 205c and may be attached to lower support brackets 215c and 215d, respectively.

In one embodiment, sidewall panel 205b may comprise two splines 225 running the length of each lateral edge of sidewall panel 205b. However, sidewall panels 205a and 205c may not comprise splines 225. In this embodiment, sidewall panel system 200 may comprise a sidewall panel 205b with splines 225, next to sidewall panels 205a and 205c that may not comprise splines 225, and that may in turn be positioned next to sidewall panels with splines 225 (not shown). Thus, it may be possible to remove one sidewall panel, for instance sidewall panel 205a, without needing to remove adjacent sidewall panels, such as sidewall panel 205b. It may also be possible to remove sidewall panel 205b while only removing sidewall panels 205a and 205c. Alternatively, sidewall panel system 200 may comprise a shingled arrangement in which each sidewall panel 205a-205c may comprise one spline 225 and may be arranged such that each sidewall panel 205a-205c overlaps the spline of an adjacent sidewall panel. Of course any number of possible arrangements and patterns are contemplated by the present disclosure and the preceding are not intended to be taken in a limiting sense.

In use, sidewall panels 205a-205c may be quickly installed without tools. For instance, sidewall panel 205b may be attached to airframe members 230b and 230c by attaching stabilizing attachments 202b(1) and 202b(2) to top support brackets 210b and 210c, respectively. Securing attachments 203b(1) and 203b(2) may be attached to lower support brackets 215b and 215c. Sidewall panel 205a may be attached to airframe members 230a and 230b by attaching stabilizing attachments 202a(1) and 202a(2) to top support brackets 210a and 210b. Securing attachments 203a(1) and 203a(2) may be attached to lower support brackets 215a and 215b. Sidewall panel 205c may be attached to airframe members 230c and 230d by attaching stabilizing attachments 202c(1) and 202c(2) to top support brackets 210c and 210d. Securing attachments 203c(1) and 203c(2) may be attached to lower support brackets 215c and 215d. Sidewall panels 205a, 205b, and 205c may then be aligned and fully secured.

Figure 3A:
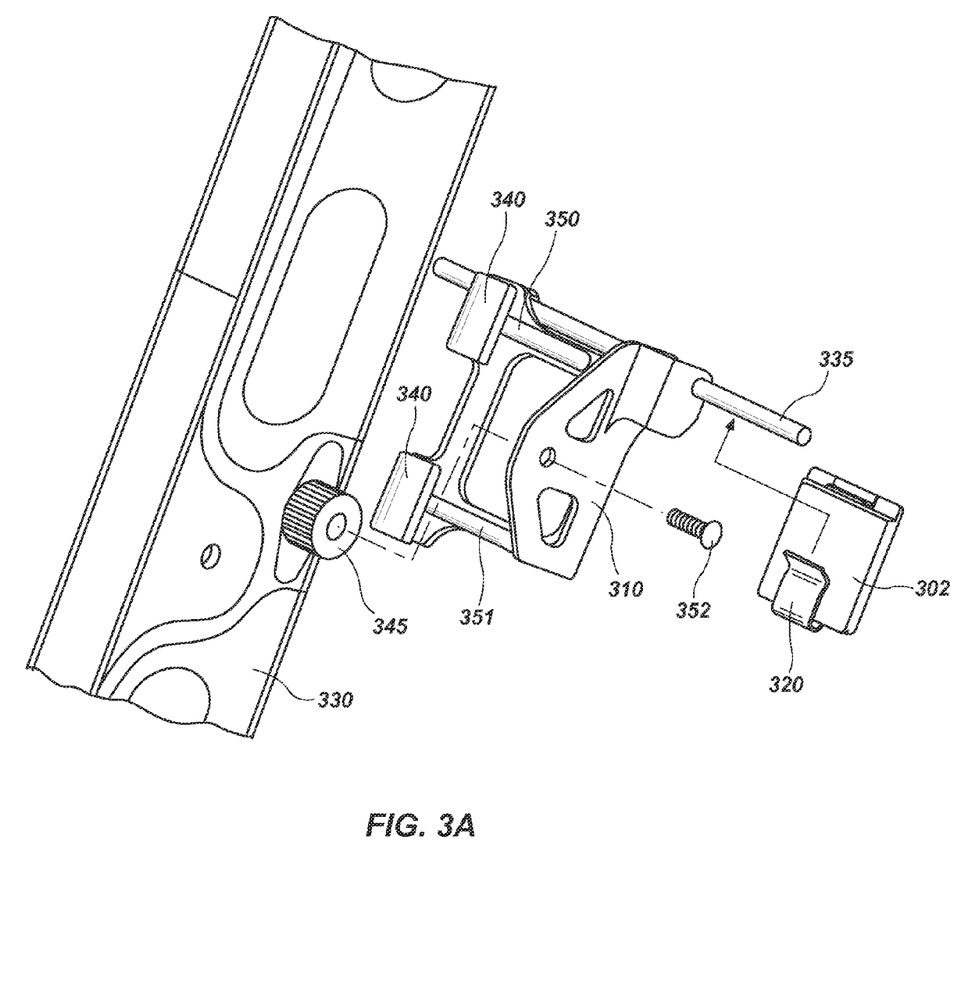
FIG. 3A is an exploded view of a Top Support Bracket.
Figure 3B:
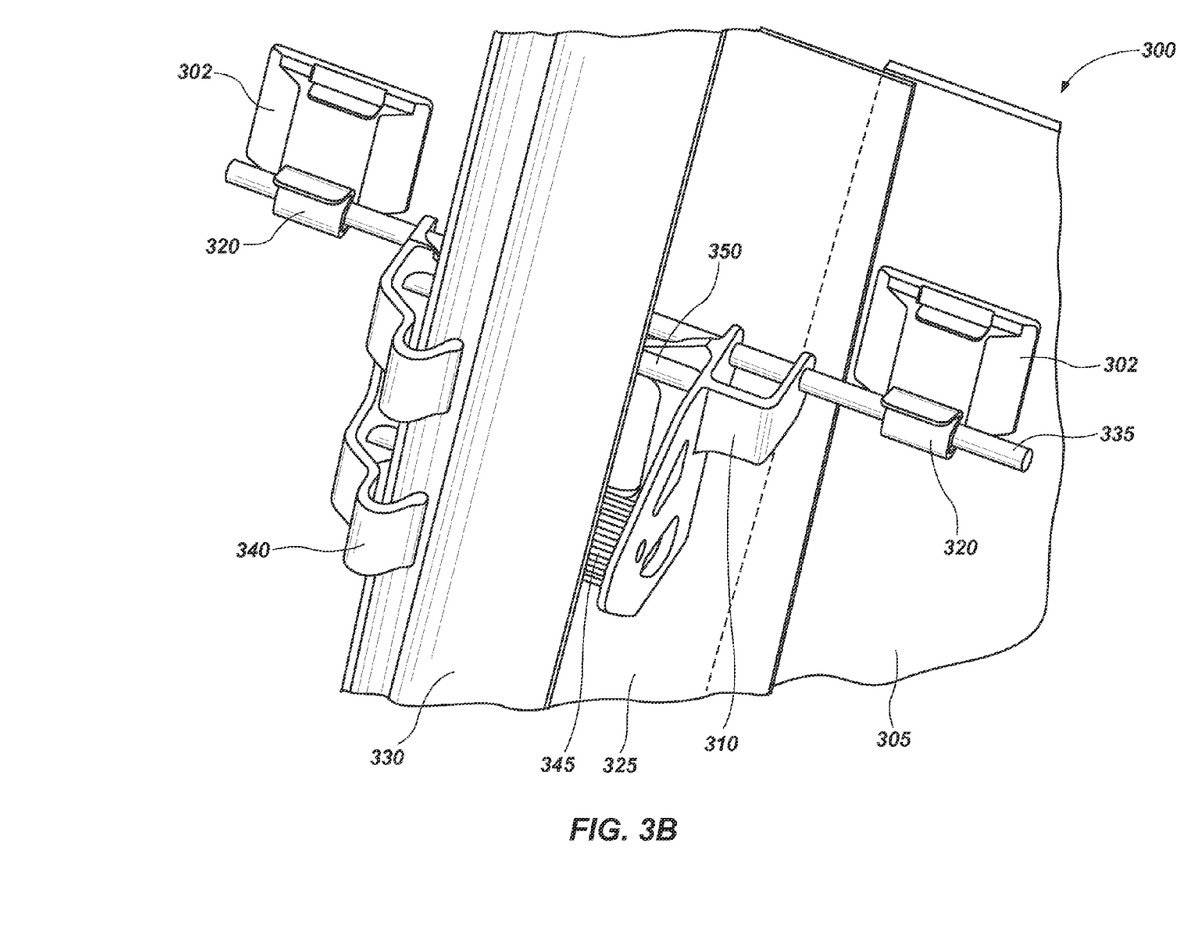
FIG. 3B is a profile view of a sidewall panel system.

FIGS. 3A and 3B shows a top support bracket 310 both attached to an airframe member 330 and in an exploded view. Top support bracket 310 may also be attached to sidewall panel 305 via stabilizing attachment 302 and mating member 335. In one embodiment, stabilizing attachment 302 may be bonded directly to the rear surface of sidewall panel 305. In this embodiment, stabilizing attachment 302 may comprise a spring clip 320. Spring clip 320 may comprise a simple stainless steel clip of a suitable shape, form, and tensile strength to support the weight of sidewall panel 305 on mating member 335. Of course, any other suitable form of attachment means may be used to stabilize sidewall panel 305 in relation to airframe member 330. For instance, spring clip 320 may be configured to have a downward facing opening, among other things.

Top support bracket 310 may be attached to airframe member 330 via an isolator 345 and attachment screw 352, both configured to isolate top support bracket 310 from vibrations and movement of airframe member 330, among other things. Top support bracket 310 may also comprise pads such as upper horizontal pad 350 and lower horizontal pad 351 configured to contact airframe member 330. Top support bracket 310 may also comprise curved fasteners 340. Curved fasteners 340 may be suitably formed to secure top support bracket 310 with a minimum of screws in, or piercing of, the insulation (not shown) of airframe member 330. Additionally, in one embodiment, curved fasteners 340 may be configured to secure the insulation of airframe member 330 in place.

Sidewall panel 305 may comprise a spline 325. As described above, spline 325 may be bonded directly to sidewall panel 305. In one embodiment, sidewall panel system 300 may comprise two types of sidewall panels: sidewall panels comprising two splines 225 (e.g., sidewall panel 205b), and sidewall panels without splines (e.g., sidewall panel 205a). Spline 325 may comprise any suitable material including plastics, rubber materials, and composites. Furthermore, spline 325 may be added to sidewall panel 305 after fabrication, or alternatively may be integrated directly into sidewall panel 305 at fabrication.

In use, top support bracket 310 may be attached to airframe member 330 at a first location. Top support bracket 310 may be attached to airframe member 330 via a single attachment screw 352 inserted through isolator 345. Additionally, top support bracket 310 may contact airframe member 330 at upper horizontal pad 350, a lower horizontal pad 351, and a pair of curved fasteners 340. In one embodiment, top support bracket 310 may comprise a soft material such as glass filled plastic materials, injection molded materials, and high performance plastics like, for instance, polyetherimide (PEI) or polyether ether ketone (PEEK). While a five point contact top support bracket 310 is described herein, any other number of suitable top support brackets 310 may be used consistent with the present disclosure.

Stabilizing attachment 302 may be bonded directly to the rear surface of sidewall panel 305. In one embodiment, stabilizing attachment 302 may comprise an upwardly open spring clip 320 configured to maintain a sufficient tension on mating member 335 to retain sidewall panel 305 in place. By including an upwardly open spring clip 320, sidewall panel 305 may be configured to slide onto mating member 335 of top support member 310 with an upward movement. Of course, any other orientation or form of stabilizing attachment 302 may be used consistent with the present disclosure. For instance, in another embodiment, stabilizing attachment 302 may comprise an attaching mechanism configured with a downward opening, among other things.

In one embodiment, mating attachment 335 comprises a rod configured to be substantially horizontal. A mating attachment 335 comprising a rod and in a substantially horizontal orientation may facilitate horizontal positioning of sidewall panel 305 relative to lower support brackets 215. However, the use of a mating attachment 335 of any number of forms and materials is contemplated by the present disclosure as long as the mating attachment is configured to attach to stabilizing attachment 302.

In practice, once stabilizing attachment 302 is attached to top support bracket 310, the inboard and outboard movement of sidewall panel 305 may be constrained while still allowing horizontal and vertical adjustments of sidewall panel 305. For instance, a mechanic installing sidewall panels 305 may be able to attach stabilizing attachments 302 of sidewall panel 305 to top support brackets 310 and then adjust the general position of sidewall panel relative to the airframe of the aircraft 101 and neighboring sidewall panels. The mechanic may then be able to engage the securing attachment (see securing attachment 603 in FIG. 6) on the lower support brackets 415, which may be used to perform horizontal and vertical alignment adjustments.

Figure 4:
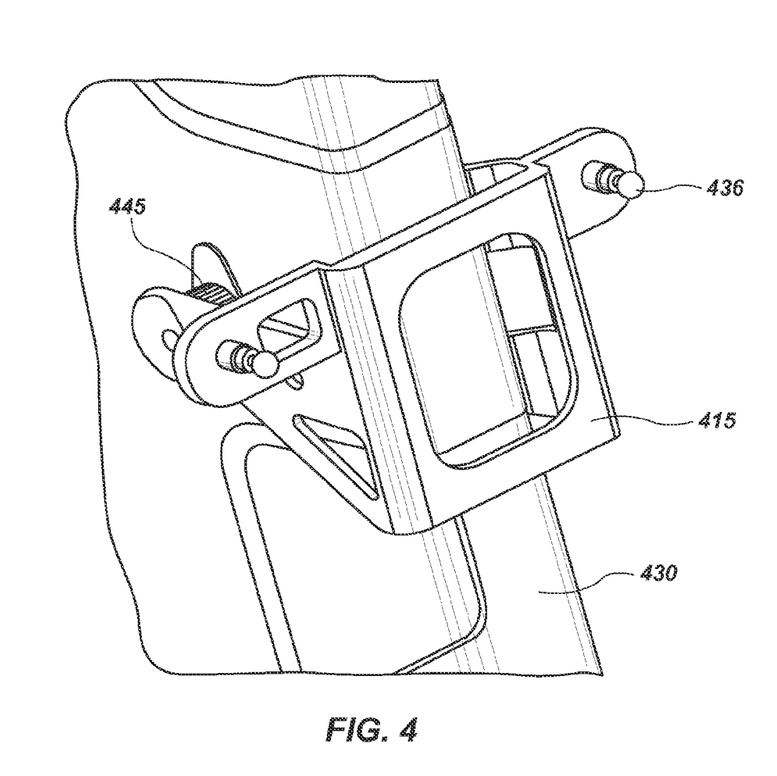
FIG. 4 is a profile view of a lower support bracket of a sidewall panel system.

FIG. 4 illustrates one embodiment of a lower support bracket 415. Lower support bracket 415 can comprise an isolator 445, via which lower support bracket 415 may be attached to airframe member 430. In one embodiment, lower support bracket 415 may be attached via two screws (not shown) in order to be sufficiently stable to support sidewall panels 305. Lower support bracket 415 may comprise mating pins 436. Mating pins 436 may be configured and shaped in order to mate with a securing attachment 603 of sidewall panels 305. For instance, mating pins 436 may be configured with ridges and indentations that may interconnect with ridges and indentations in a securing attachment such as securing attachment 203a(1).

In use, sidewall panel 305 may be attached to top support bracket 310 and retained in proximity to airframe member 430. Securing attachment 603 of sidewall panel 305 may engage lower support bracket 415 via mating pin 436. Once mating pin 436 is engaged in securing attachment 603, movement of sidewall panel 305 may be constrained in horizontal and vertical directions. For example, in one embodiment, once mating pin 436 is engaged in securing attachment 603 the mechanic may be able to adjust the horizontal alignment of sidewall panel 305 relative to the airframe of aircraft 101 and adjacent sidewall panels. Once sidewall panel 305 is in the desired location, the mechanic may be able to fully secure securing attachment 603 by, for instance, fully inserting mating pin 436 into securing attachment 603 to lock and fully secure sidewall panel 305. In another embodiment, the process of engaging a securing attachment 603, adjusting the vertical alignment of sidewall panel 305, and fully securing sidewall panel 305 may be repeated as necessary to install all of the sidewall panels 105a-105n in the aircraft 101.

Figure 5A:
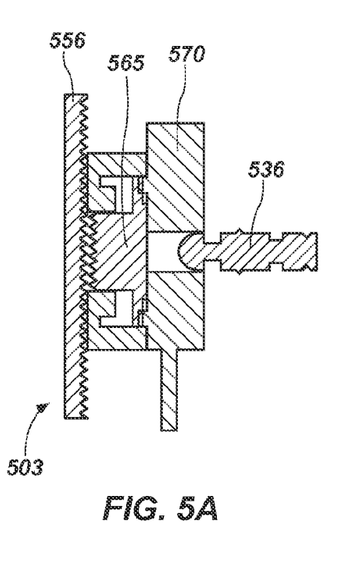
FIGS. 5A and 5B illustrate the engagement and locking of a securing attachment.
Figure 5B:
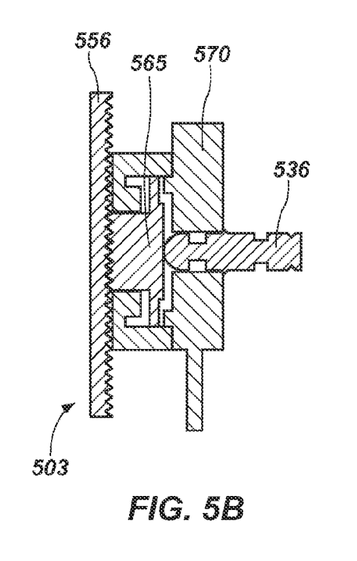

FIGS. 5A and 5B are wireframe illustrations demonstrating the relationship between mating pin 536 and securing attachment 503. As shown in FIGS. 5A and 5B, securing attachment 503 comprises a gripping surface 556, a locking plunger 565, and a snap attachment 570.

When mating pin 536 is engaged in securing attachment 503 (see FIG. 5A), locking plunger 565 may be retained in an open position by a spring 660 (not shown on FIG. 5A). Thus, snap attachment 570 may be free to move relative to gripping surface 556. When mating pin 536 is fully inserted in securing attachment 503 (see FIG. 5B), mating pin 536 may place pressure upon locking plunger 565 and fully secure snap attachment 570 in relation to gripping surface 556, thereby restricting movement of securing attachment 503 relative to lower support bracket 415.

Of course, this is but one embodiment contemplated by the present disclosure. Indeed, any suitable form of securing attachment 503 may be implemented as long as it allows horizontal and/or vertical adjustments of sidewall panel 503. For instance, a lever-based securing attachment 503, among other things, may be used to fully secure sidewall panel 503. In a lever-based securing attachment embodiment (not shown), a lever mechanism comprising a bar may be configured to rotate around a fixed point and apply a pressure upon a securing attachment 503 to maintain securing attachment 503 in place.

Figure 6:
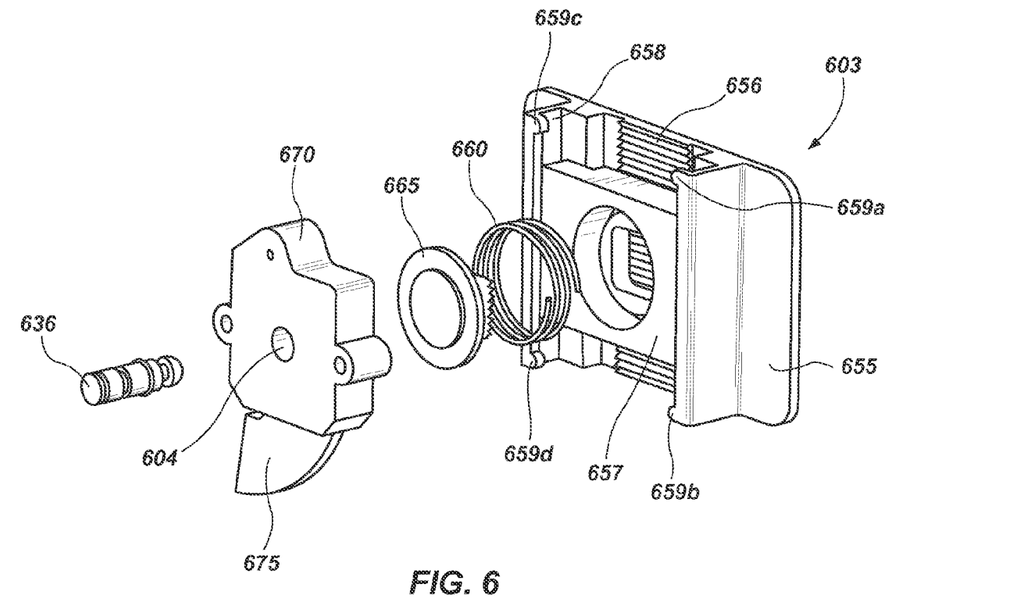
FIG. 6 is an exploded view of a securing attachment.

FIG. 6 shows a perspective view of an exploded illustration of securing attachment 603. Securing attachment 603 may comprise a base 655 that may be bonded to a rear surface of a sidewall panel 305. The base 655 may comprise a gripping surface 656. Gripping surface 656 may comprise any number of possible materials and forms. For instance, in FIG. 6 gripping surface 656 has a serrated surface that corresponds with the serrated surface of locking plunger 665. In another example, gripping surface 656 could comprise indentations, ridges, or any other number of surface forms that mate to corresponding surfaces on locking plunger 665.

Securing attachment 603 may also comprise a slider 657 configured to slide within a slider channel 658 of base 655. Securing attachment 603 may be arranged on sidewall panel 305 such that slider 657 moves substantially vertically (i.e., along the water line (WL)), or such that slider 657 moves substantially horizontally. Thus, when mating pin 636 is engaged in mating recess 604 of snap attachment 670 but not fully inserted therein, mating pin 636, snap attachment 670, locking plunger 665, and slider 657 may all slide in relation to base 655. Securing attachment 603 may also comprise base prongs 659a-659d configured to constrain the movement of snap attachment 670 to within a predetermined range. It is to be understood that the greater the distance between base prongs 659a and 659c relative to base prongs 659b and 659d, the greater range of movement that snap attachment 670 may have.

Securing attachment 603 may also comprise a spring 660 arranged within slider 657 and configured to provide a force sufficient to push locking plunger 665 away from gripping surface 656 of base 655. Thus, in one embodiment's default position, locking plunger 665 may not be in contact with gripping surface 656. However, when a force is applied to locking plunger 665 that is sufficient to overcome the force provided by spring 660, locking plunger 665 may contact gripping surface 656. In one embodiment, mating pin 636 may be inserted into snap attachment 670, via mating recess 604, to an engagement position wherein mating pin 636 is held in place within mating recess 604 of snap attachment 670, but nevertheless where mating pin 636 does not provide sufficient force to locking plunger 665 to overcome the force being applied by spring 660. Mating pin 636 may be further inserted into mating recess 604 of snap attachment 670 such that a ridge or indentation on mating pin 636 interlocks with a portion of release lever 675 or some other clasp or feature within mating recess 604 and/or snap attachment 670, and further wherein mating pin 636 provides a force to locking plunger 665 sufficient to overcome the force of spring 660 and therefore pushes locking plunger 665 against gripping surface 656. Furthermore, release lever 675 may be actuated to release mating pin 636 from mating recess 604 of snap attachment 670, releasing locking plunger 665, and once again allowing snap attachment 670 to slide freely with slider 657 in relation to base 655 and gripping surface 656.

In operation, and as described above, a mechanic may attach a stabilizing attachment 302 of a sidewall panel 305 to a top support bracket 310 and retain sidewall panel 305 in proximity to an airframe member 335. The mechanic may then position and engage one or more mating pins 636, which are connected to lower support brackets 415, with one or more securing attachments 603. In one embodiment, sidewall panel 305 comprises two securing attachments 603, one in each of two lower quadrants of a rear surface of sidewall panel 305. The mechanic may engage the respective mating pins 636 in securing attachments 603. The mechanic may adjust a first alignment of sidewall panel 305 (e.g., a horizontal alignment) and may fully lock a first of the two securing attachments 603 by applying a force to sidewall panel 305 sufficient to cause mating pin 636 to fully engage into the first securing attachment 603. The mechanic may then adjust a second alignment of sidewall panel 305 (e.g., a vertical alignment), and may fully lock the second securing attachment 603 by applying a force to sidewall panel 305 sufficient to cause the second mating pin 636 to fully engage into the second securing attachment 603.

In one embodiment, when the securing attachments 603 of a sidewall panel 305 are fully locked, locking plunger 665 may be in contact with gripping surface 656 such that sidewall panel 305 may be completely immobile relative to the airframe of aircraft 101. Sidewall panel 305 may be released by actuating release lever 675 of securing attachments 603 of sidewall panel 305. It may be possible to then remove the lower portion of sidewall panel 305 and then detach the stabilizing attachments 302 of sidewall panel 305 from top support brackets 310.

As has been described above, rather than using a pin-based arrangement, securing attachment 603 may employ any other suitable mechanism in order to allow sidewall panel 305 to be adjusted vertically and horizontally in relation to airframe members 430, and then fully secure sidewall panel 305 once a desired alignment is achieved.

Figure 7:
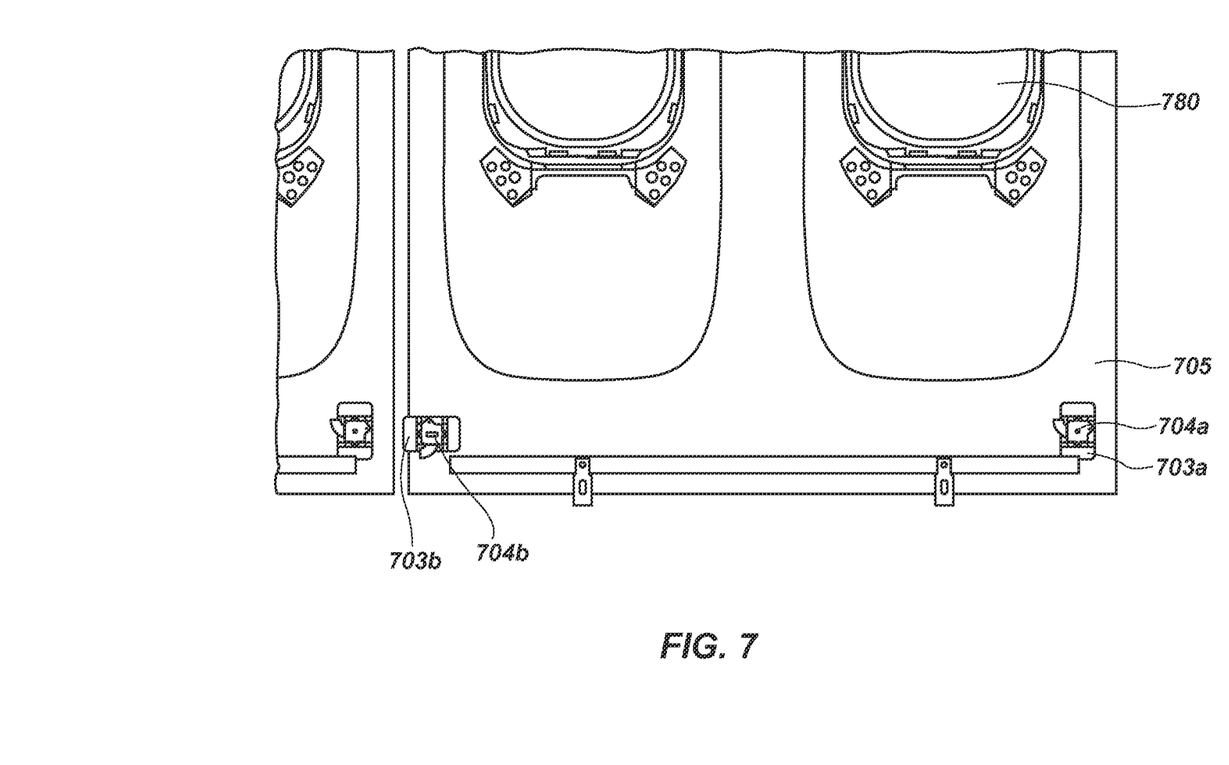
FIG. 7 is a bottom profile view of the rear surface of a sidewall panel.

FIG. 7 is a profile view of the lower rear surface of a sidewall panel 705 illustrating the placement and orientation of securing attachments 703a and 703b. In one embodiment, securing attachment 703a may be arranged to allow snap attachment 670 to slide substantially horizontally. FIG. 7 also shows a mating recess 704a that may be configured to accept mating pin 636. Securing attachment 703b may be arranged to permit snap attachment 670 to slide substantially vertically. Mating recess 704b may be a slot or elongated opening to facilitate engaging mating pin 636. A sidewall panel 705 with securing attachments 703a and 703b may be configured to facilitate aligning window opening 780 with the windows of the aircraft 101.

In operation, sidewall panel 705 may be positioned in proximity to the airframe of an aircraft 101. Sidewall panel 705 may be attached to the airframe via stabilizing attachments 302. In one embodiment, once sidewall panel 705 is attached to the airframe with stabilizing attachments 302, it may nevertheless still be possible to move sidewall panel 705 horizontally and vertically for alignment. In yet another embodiment, once stabilizing attachments 302 are attached, sidewall panel 705 may hang freely, such that the movement of sidewall panel 705 may be constrained in one or more directions yet nevertheless may move in at least one other direction. For instance, in one embodiment, the inboard/outboard movement of sidewall panel 705 may be constrained while nevertheless permitting lateral and water line movement of sidewall panel 705.

Sidewall panel 705 may then be positioned relative to lower support brackets 415, and securing attachment 703a, which may be bonded to sidewall panel 705, may engage mating pin 636 of lower support bracket 415. Once mating pin 636 is engaged in mating recess 704a, sidewall panel 705 may be adjusted substantially horizontally and aligned with the airframe and adjacent sidewall panels 705. Mating pin 636 may be fully engaged into snap attachment 670 by applying pressure to sidewall panel 705 in the proximity of securing attachment 703a. Once mating pin 636 is fully inserted into mating recess 704a, mating pin 636 may apply pressure to locking plunger 665 and cause locking plunger 665 to contact gripping surface 656. In one embodiment, once securing attachment 703a is fully locked and locking plunger 665 contacts gripping surface 656, it may be possible to engage a second mating pin 636 in mating recess 704b of securing attachment 703b. Sidewall panel 705 may then be adjusted vertically and aligned with the airframe and adjacent sidewall panels 705. Mating pin 636 may then be fully inserted into mating recess 704b to cause locking plunger 665 to contact gripping surface 656 of securing attachment 703b. In one embodiment, once both securing attachments 703a and 703b are fully secured, sidewall panel 705 may be completely installed.

Figure 8:
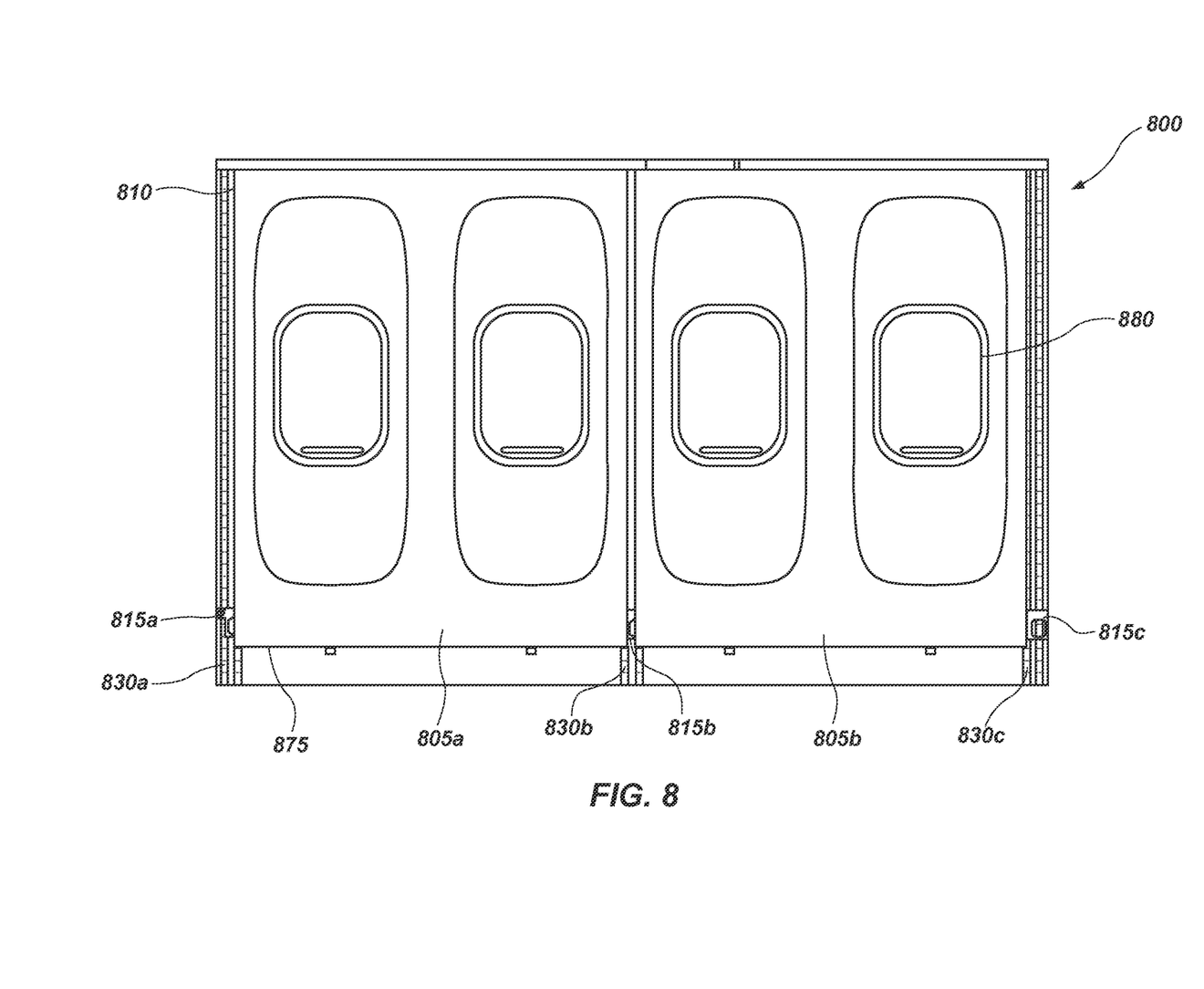
FIG. 8 is a profile view of a sidewall panel system.

FIG. 8 shows an interior view of sidewall panel system 800 comprising sidewall panels 805a and 805b. FIG. 8 also shows airframe members 830a-830c. FIG. 8 does not include splines 325, which may normally cover airframe members 830a-830c; the omission of splines 325 may illustrate the attachment of sidewall panels 805a and 805b to airframe members 830a-830c. Sidewall panel system 800 may also comprise lower brackets 815a-815c and top support brackets 810. Sidewall panels 805a and 805b may be attached to airframe members 830a-830c via stabilizing attachments 302 and securing attachments 603 (not shown). In one embodiment, release lever 675 of securing attachments 603 may be accessible in order to release sidewall panels 805a and 805b.

In one embodiment, sidewall panels 805a and 805b may be aligned and adjusted from the interior of the fuselage of aircraft 101 and without removing sidewall panels 805a and 805b to adjust shock mount brackets, among other things. Interior installation may facilitate proper alignment and may accelerate the installation process. Installing sidewall panel 805b from the interior may facilitate proper alignment with a previously installed and adjacent sidewall panel 805a, and may also facilitate proper alignment of window opening 880 with the windows of the aircraft 101. In one embodiment, sidewall panels 805a and 805b may be required to be parallel.

Figure 9:
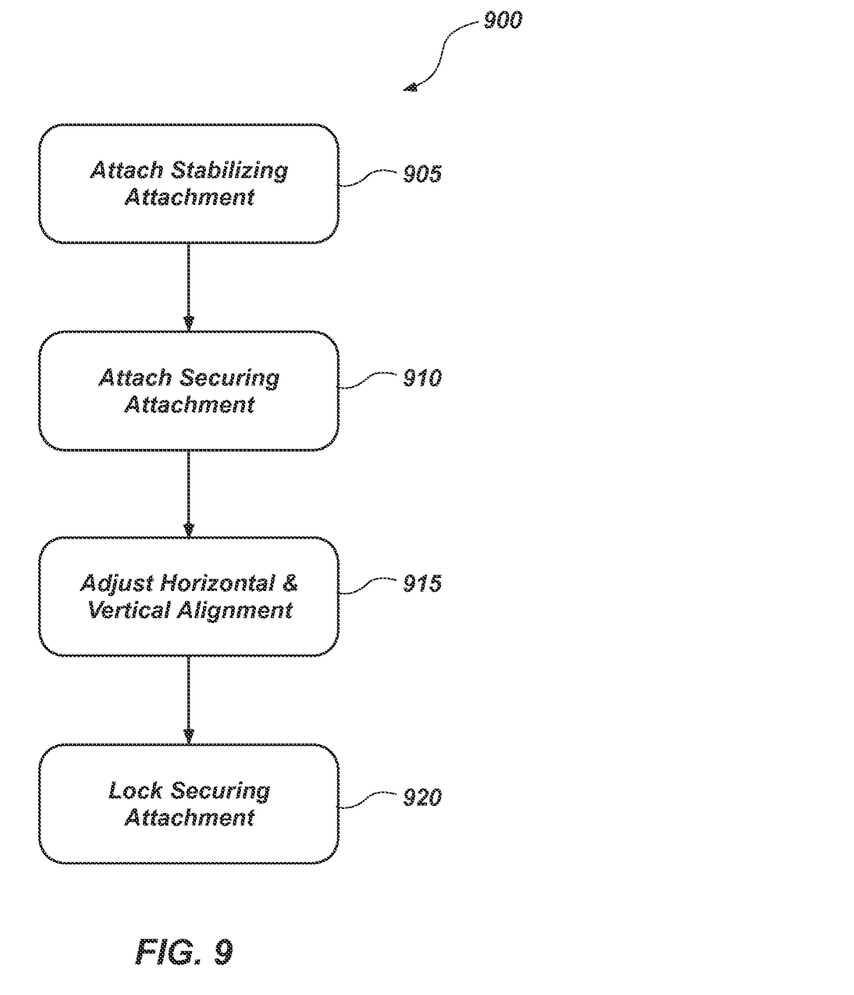
FIG. 9 illustrates a method of installing a sidewall panel system.

FIG. 9 illustrates one method 900 of securing a sidewall panel 705. In a first method step 905, a sidewall panel 705 comprising two stabilizing attachments 302 is attached to two top support brackets 310. The top support brackets 310 may each be attached to a different airframe member 330 and may comprise a mating member 335. The two stabilizing attachments 302 may be slidably attached to mating members 335 via a spring clip 320. Stabilizing attachments 302 may retain sidewall panel 705 in proximity to airframe members 330. In one embodiment, sidewall panel 705 may be adjusted horizontally and vertically when stabilizing attachments 302 are attached to top support brackets 310.

In a second method step 910, sidewall panel 705 may comprise two securing attachments 703a and 703b and may be positioned such that the mating pins 636 of lower support brackets 815a and 815b engage mating recesses 704a and 704b. In one embodiment, once in the initial engaged position, sidewall panel 705 can still be adjusted both horizontally and vertically. Mating pins 636 may be inserted into mating recesses 704a and 704b sufficiently to retain mating pins 636 within securing attachments 703a and 703b, but not enough to exert pressure on locking plunger 665. In one embodiment, mating pins 636 and snap attachment 670 may be configured such that mating pins 636 may be lightly retained within snap attachment 670 by interlocking ridges and indentations, among other things.

In a third method step 915, sidewall panel 705 may be adjusted and aligned substantially horizontally and substantially vertically. In one embodiment, horizontal alignment may be performed independently of vertical alignment. However, it is to be understood that concurrent adjustments are also contemplated by the current disclosure. Furthermore, alignment in other directions is also contemplated. For instance, in one embodiment, sidewall panel 705 may be aligned in substantially inboard and substantially outboard directions.

In a fourth method step 920, sidewall panel 705 may be locked into position by locking securing attachments 703a and 703b. In one embodiment, sidewall panel 705 may be first aligned substantially horizontally and then locked into place via securing attachment 703a. Sidewall panel 705 may then be substantially vertically aligned and then locked into place via securing attachment 703b. In one embodiment, sidewall panel 705 may be removed by actuating release lever 875 and reversing the method steps 905-920.

Although this disclosure has been described in terms of certain preferred embodiments, other embodiments that are apparent to those of ordinary skill in the art, including embodiments that do not provide all of the features and advantages set forth herein, are also within the scope of this disclosure. Accordingly, the scope of the present disclosure is defined only by reference to the appended claims and equivalents thereof.

What is claimed is:

1. A system for attaching an aircraft wall panel to an airframe member, the system comprising:
   a top support bracket coupled to a first location on the airframe member and comprising a substantially horizontal mating member;
   a lower support bracket coupled to a second location on the airframe member and comprising a mating pin fixedly attached thereto and extending in a generally inboard direction relative to the aircraft;
   an aircraft wall panel comprising a first stabilizing attachment and a first securing attachment, the first stabilizing and securing attachments arranged on a rear surface of the aircraft wall panel, wherein
   the first stabilizing attachment includes a clip, configured to connect to the mating member of the top support bracket and retain the aircraft wall panel in proximity to the airframe member, and wherein the first securing attachment is configured to connect to the mating pin of the lower support bracket to (a) engage the lower support bracket and facilitate positional adjustments of the aircraft wall panel in relation to the airframe member, and (b) lock a position of the first securing attachment relative to the lower support bracket.

2. The system of claim 1 wherein the top support bracket comprises an isolator, at least one horizontal pad, and at least one curved fastener configured to curve around a portion of the airframe member, and further wherein the top support bracket is attached to the airframe member via a single screw that passes through the isolator.

3. The system of claim 1 wherein the lower support bracket comprises at least one isolator, and at least one horizontal pad, and further wherein the lower support bracket is attached to the airframe member via one screw that passes through the at least one isolator.

4. The system of claim 2 wherein the top support bracket comprises polyetherimide (PEI) or polyether ether ketone (PEEK) and is configured to retain insulation around the airframe member.

5. The system of claim 1 wherein the first securing attachment comprises:
a base bonded to the aircraft wall panel;
a slider arranged within a channel on the base and configured to slide in a predetermined direction relative to the base;
a plunger arranged within the slider and in proximity to a gripping surface of the base;
a spring arranged between the plunger and the slider;
a snap attachment connected to the plunger and configured receive the mating pin and facilitate a connection between the mating pin and the plunger; and
a release lever integrated into the snap attachment and configured to retain and release the mating pin.

6. The system of claim 1 wherein the clip of the first stabilizing attachment comprises a spring clip.

7. The system of claim 6 wherein the spring clip comprises an upward opening and further wherein the spring clip comprises steel or a steel alloy.

8. The system of claim 1 wherein the aircraft wall panel also comprises a first spline running vertically down a first lateral side of the aircraft wall panel and a second spline running vertically down a second lateral side of the aircraft wall panel, and further wherein the first and second splines are configured such that adjacent aircraft wall panels overlap the first and second splines.

9. The system of claim 1 wherein the mating member of the top support bracket is configured to attach to a stabilizing attachment of a second aircraft wall panel, and wherein the lower support bracket comprises a second mating pin.

10. The system of claim 1 wherein the aircraft wall panel comprises a second securing attachment and wherein the first securing attachment is configured to facilitate alignment of the aircraft wall panel in a first direction and the second securing attachment is configured to facilitate alignment of the aircraft wall panel in a second direction.

11. The system of claim 10 wherein each of the first and second securing attachments comprises a mating recess configured to receive the mating pin, and further wherein the mating recess of the second securing attachment is substantially oblong.

12. The system of claim 1, further comprising a release lever, integrated into the first securing attachment, configured to allow selective retention and release of the mating pin within the first securing attachment.

13. A system for attaching a wall panel to a frame member, the system comprising:
a top support bracket coupled to a first location on the frame member and having a substantially horizontal mating member;
a lower support bracket coupled to a second location on the frame member and having a mating pin extending away from the frame member;
a first wall panel comprising at least one stabilizing attachment having a clip and at least one securing attachment, wherein
the clip of the at least one stabilizing attachment is configured to connect to the top support bracket and retain the first wall panel in proximity to the frame member, and wherein
the at least one securing attachment is configured to receive the mating pin to connect to the lower support bracket to (a) engage the lower support bracket and facilitate positional adjustments of the wall panel in relation to the frame member, and (b) lock a position of the at least one securing attachment relative to the lower support bracket.

14. The system of claim 13 further comprising:
a second and a third wall panel, and wherein the first wall panel comprises a first spline running vertically along a first lateral side of the first wall panel and a second spline running vertically along a second lateral side of the first wall panel; and wherein
the second and third wall panels each comprise splineless lateral sides and are configured to overlap the first and second splines of the first wall panel.

15. The system of claim 14 wherein the first and second splines and the first wall panel are integrated in a unitary structure.

16. The system of claim 13 wherein the at least one securing attachment comprises a mating recess configured to receive the mating pin of the lower support bracket.

17. The system of claim 13 wherein the clip of the at least one stabilizing attachment comprises a spring clip configured to attach to the mating member of the top support bracket.

18. The system of claim 16, further comprising a release lever, integrated into the at least one securing attachment and movable with respect to the mating recess, configured to allow selective retention and release of the mating pin within the mating recess.

19. The system of claim 13, wherein the at least one securing attachment comprises:
a base, bonded to the aircraft wall panel;
a slider, arranged within a channel on the base and configured to slide in a predetermined direction relative to the base;
a plunger, arranged within the slider and in proximity to a gripping surface of the base;
a spring, arranged between the plunger and the slider;
a snap attachment, connected to the plunger and configured receive the mating pin and facilitate a connection between the mating pin and the plunger; and
a release lever, integrated into the snap attachment and configured to selectively retain and release the mating pin.

20. The system of claim 13, wherein the at least one securing attachment comprises first and second securing attachments, the first securing attachment being configured to facilitate alignment of the aircraft wall panel in a first direction, and the second securing attachment being configured to facilitate alignment of the aircraft wall panel in a second direction.

\* \* \* \* \*